United States Patent

[11] 3,572,851

| [72] | Inventor | Paul W. Schuler<br>2201 Payne Ave., St. Paul, Minn. 55117 |
|---|---|---|
| [21] | Appl. No. | 794,271 |
| [22] | Filed | Jan. 27, 1969 |
| [45] | Patented | Mar. 30, 1971 |

[54] SNOWMOBILE TRACK CLEAT STUD
6 Claims, 6 Drawing Figs.

[52] U.S. Cl. .................................................. 305/35,
                                                                 305/54
[51] Int. Cl. ....................................................... B62d 55/24
[50] Field of Search ........................................... 305/38, 35,
                                                         54, 55; 152/222, 229, 227

[56] References Cited
UNITED STATES PATENTS

| 1,213,949 | 1/1917 | Reger ............................ | 152/227 |
| 2,563,848 | 8/1951 | Knox ............................ | 305/54 |
| 3,199,620 | 8/1965 | Wheeler ....................... | 305/35X |
| 3,295,622 | 1/1967 | Pitchford ..................... | 305/35X |

FOREIGN PATENTS

| 99,751 | 2/1962 | Norway ........................ | 305/38 |

*Primary Examiner*—Richard J. Johnson
*Attorney*—Wicks & Nemer

ABSTRACT: A studded cleat for snowmobile endless driving track including a channel having parallelly disposed spaced sidewalls connected to a bottom, a stud having parallelly disposed side portions connected to a bottom at the edges thereof, the side portions being tapered at the outer ends thereof with the stud secured within the sidewalls of the channel.

PATENTED MAR 30 1971
3,572,851
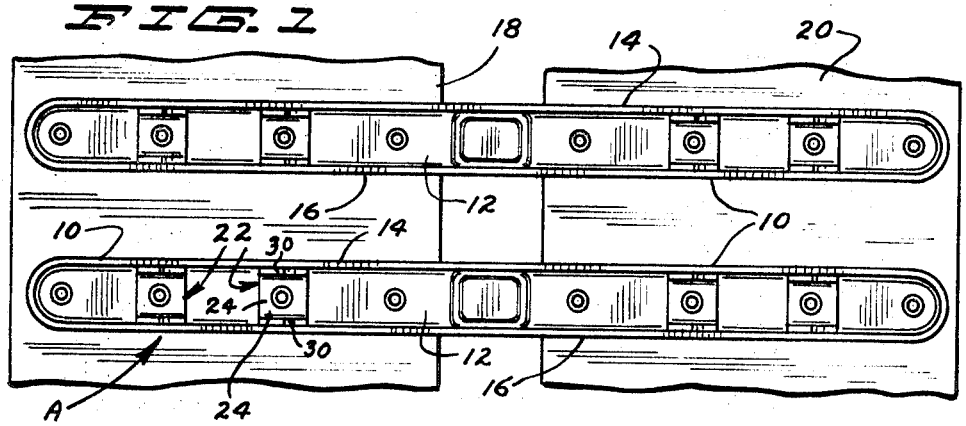
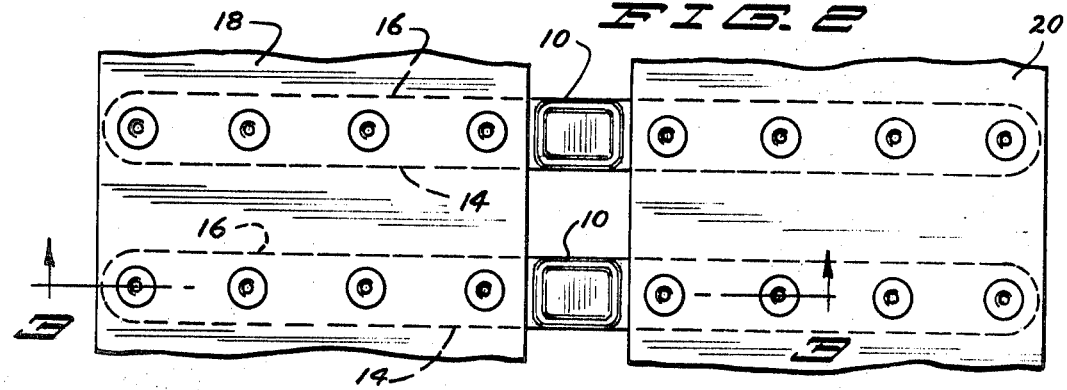
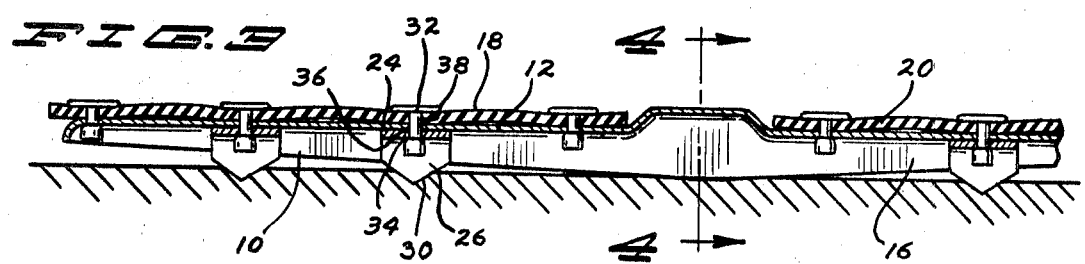
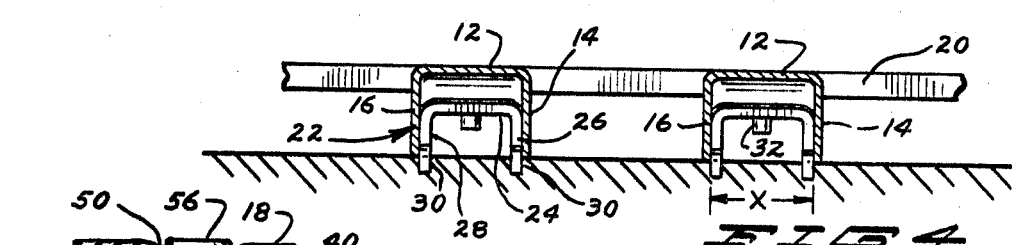
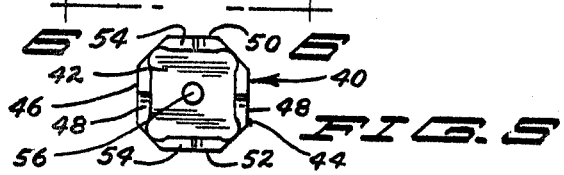
INVENTOR.
PAUL W. SCHULER
BY
Carlsen, Carlsen, Sturm & Wickn
ATTORNEYS

SNOWMOBILE TRACK CLEAT STUD

SUMMARY OF THE INVENTION

The invention relates broadly to an improvement in cleats for the endless driving track of a snowmobile and more particularly to a studded cleat for the track. It is an object of the invention to provide a cleat in the form of a channel having one or more studs secured thereon, the width of the stud being substantially equal to the distance between the sidewalls of the channel whereby lateral displacement is prevented. The stud is secured within the channel by means of a rivet, welding or similar means. The stud is formed of a bottom portion with upstanding side portions, the side portions having tapered outer ends. The aforementioned stud provides forward traction and less side slip without grabbing.

These and other more detailed and specific objects will be disclosed in the course of the following specification, reference being had to the accompanying drawings, in which:

FIG. 1 is a bottom plan view of a pair of cleats with studs for snowmobile endless tracks embodying the invention;

FIG. 2 is a top plan view of that shown in FIG. 1;

FIG. 3 is a sectional view taken on the line 3—3 of FIG. 2;

FIG. 4 is a sectional view taken on the line 4—4 of FIG. 3;

FIG. 5 is a side elevational view of a further embodiment of the invention secured to a portion of an endless track;

FIG. 6 is a view on the line 6—6 of FIG. 5.

Referring to the drawings in detail, the cleat A includes the channel 10 formed of the bottom wall 12 and the upstanding sidewalls 14 and 16. The channel 10 is secured to the outer surface of the flexible track members 18 and 20. Further provided is the stud 22 which includes the flat base 24, and extending from one edge of the base at a right angle thereto is the first side portion 26. Extending from the opposite edge of the base and at a right angle thereto is the second side portion 28.

Each of the upper ends of the side portions 26 and 28 is formed with a broad tapered portion 30. The length of the stud 22 as at X is equal to the width of the channel between the sidewalls 14 and 16. With the stud 22 secured within the channel and upon the bottom 12 by means of the rivet 32 extended through hole 34 of the stud, the hole 36 of the channel and through the hole 38 of the track member 18, the walls of the channel prevent displacement of the stud on the cleat.

The broad tapered portions 30 of the stud dig into the ice and snow to aid in providing forward motion of the snowmobile and the same limit lateral sliding of the snowmobile without sudden or abrupt grabbing in attaining traction. The stud 22 may be riveted to the track members 18 and 20 directly without placing the same in the cleat 10. The vertical dimension of the stud 22 is greater than the depth of the channel 10.

In FIGS. 5 and 6 is illustrated a further embodiment of the invention. The stud 40 includes the flat bottom 42 and extending upwardly from two parallel edges and at right angles to the bottom 42 are the spaced and opposed side portions 44 and 46. Each of the upper ends of the side portions 44 and 46 is formed with a broad tapered portion 48. The stud 40 further includes the spaced and opposed side portions 50 and 52 extending upwardly from two parallel edges and at right angles to the bottom 42. Each of the upper ends of the side portions 50 and 52 is formed with a broad tapered portion 54. The stud 40 is generally secured to the track members 18 and 20 directly by means of a rivet such as 56 which extends through a hole in the bottom 42 and a hole in the track member 18 as illustrated in FIGS. 5 and 6.

The overall width and length of the stud 40 is equal to the width of the channel between the sidewalls 14 and 16. As a result the stud 40 may also be secured in a channel such as 10 as in the case of stud 22 and it is held firmly against displacement as related above with regard to stud 22. With the stud 40 secured directly to a track member such as 18 the same will tend to rotate on the unit 56 but there will always be two side portions substantially parallel with the direction of travel to provide forward traction. The stud 40 is used primarily on a track that has no channel cleats such as 10. The advantages of the side portions 44, 46, 50 and 52 are the same as set forth with regard to the side portions 26 and 28 of stud 22.

I claim:

1. A studded cleat for a snowmobile endless driving track, comprising in combination:

a. a channellike cleat secured upon the outer surface of the track with the longitudinal dimension of the channel extending along a line transverse to the intended direction of movement of the snowmobile;

b. a stud for use with the cleat, comprising:

1. a bottom wall parallelly arranged with respect to the bottom of the channel within the channel;

2. a pair of parallelly disposed sidewalls integrally formed with opposing ends of the bottom wall in a manner to extend outwardly at right angles to the bottom wall in a direction away from the track and along a line transverse to the intended direction of movement of the snowmobile, the length of the stud along a line parallel to the intended direction of motion of the snowmobile being substantially equal to the distance between the channel walls whereby the walls of the channel prevent displacement of the stud on the cleat in a direction parallel to the intended direction of motion of the snowmobile, the height of the stud in a direction at right angles to the bottom of the channel being greater than the depth of the channel such that the sidewalls extend outwardly from the outer surface of the track a greater distance than the channel walls, the sidewalls of the stud further including a portion broadly tapered along a line transverse to the intended direction of motion of the snowmobile whereby the stud may dig into the ice and snow to aid in providing forward motion of the snowmobile and at the same time limit lateral sliding of the snowmobile without sudden or abrupt grabbing in attaining traction; and c. means for securing said stud in said channel.

2. The device of claim 1 in which at least one sidewall of each stud includes a double taper forming a point along the outer edge of the sidewall furthermost from the track.

3. The device of claim 2, in which:

a. the bottom wall includes a hole; and b. the means for securing said stud in said channel comprises at least one rivet.

4. A one-piece stud for use on a snowmobile endless driving track, either with or without a cleat, comprising:

a. a bottom wall having at least four ends parallelly arranged with respect to the surface of the track, the bottom wall including a hole to allow detachment of the stud to the track;

b. a first pair of parallelly disposed sidewalls integrally formed with a first pair of opposing ends of the bottom in a manner to extend outwardly at right angles to the bottom wall away from the outer surface of the track and along a line transverse to the intended direction of motion of the snowmobile, the first pair of sidewalls further including a broadly tapered portion, with the taper extending along a line transverse to the intended direction of motion of the snowmobile; and c. a second pair of parallelly disposed sidewalls integrally formed with a second pair of opposing ends of the bottom wall in a manner to extend outwardly at right angles to the bottom wall away from the outer surface of the track and along a line parallel to the intended direction of motion of the snowmobile, the walls further including a broadly tapered portion, with the taper extending along a line parallel to the intended direction of motion of the snowmobile; whereby the stud may be directly secured to a track member such that if the stud tends to rotate upon the track member, there will always be two side portions substantially parallel to the intended direction of motion of the snowmobile and two side portions substantially transverse to the intended direction of motion of the snowmobile to provide forward traction and to limit lateral sliding of the snowmobile without sudden or abrupt grabbing in attaining traction.

5. The device of claim 4, wherein each sidewall includes a double taper forming a point along the edge of the sidewall furthermost from the track.

6. The device of claim 6 in which:
a. the bottom wall comprises a square; and
b. the width of all sidewalls is substantially equal whereby a regular stud is formed which better provides uniformity of performance.